United States Patent [19]

Watanabe et al.

[11] Patent Number: 5,452,035
[45] Date of Patent: Sep. 19, 1995

[54] PATRONE WITH SELECTIVE LOCKING MEANS AND CAMERA USABLE THEREWITH

[75] Inventors: Hiroyoshi Watanabe, Hino; Masaki Nagao, Tokyo; Shinichi Kodama, Hino; Junichi Ito, Hachioji, all of Japan

[73] Assignee: Olympus Optical Co., Ltd., Tokyo, Japan

[21] Appl. No.: 103,897

[22] Filed: Aug. 6, 1993

[30] Foreign Application Priority Data

Aug. 7, 1992 [JP] Japan .................. 4-211774

[51] Int. Cl.⁶ ........................................ G03B 17/26
[52] U.S. Cl. ........................... 354/275; 242/348.3
[58] Field of Search ............. 354/275; 242/71.1, 71.2, 242/71.7, 348.3

[56] References Cited

U.S. PATENT DOCUMENTS

| | | | |
|---|---|---|---|
| 3,807,840 | 4/1974 | Cook et al. ................. | 352/62 |
| 4,987,437 | 1/1991 | Pagano et al. .............. | 354/275 |
| 4,991,786 | 2/1991 | Cloutier et al. ............. | 354/275 X |
| 5,030,978 | 7/1991 | Stoneham et al. ........... | 354/275 X |
| 5,031,853 | 7/1991 | Jensen ....................... | 354/275 X |
| 5,065,952 | 11/1991 | Baxter et al. ............... | 242/71.1 |
| 5,115,268 | 5/1992 | Kitagawa et al. ............ | 354/275 |
| 5,363,167 | 11/1994 | Takatori ..................... | 354/275 |

FOREIGN PATENT DOCUMENTS 2-114257  4/1990  Japan .
2-214854  8/1990  Japan .

*Primary Examiner*—Russell E. Adams
*Assistant Examiner*—J. K. Han
*Attorney, Agent, or Firm*—Louis Weinstein

[57] ABSTRACT

A Patrone and a camera using the Patrone. The Patrone comprises a film wind spool arranged in a cylindrical body, of which upper and lower ends are light-tightly sealed. The body stores film so that the film can move freely in or out of the body in such a manner that the film can rotate freely, and is wound about said spool in roll form. Locking members are arranged in the cylindrical body and can be displaced freely relative to the spool. Ends of the locking members normally project outwardly from the cylindrical body. Locked members are arranged opposed to said locking members and are formed substantially as parts of one of the cylindrical body or spool. An elastic member normally urges each of the locked members toward engagement with an associated locking member. A camera includes an unlocking member which presses the locking members of the Patrone to displace them against the force of the elastic member when the Patrone is mounted in a camera thereby disengaging the locking members from the locked members and enabling the spool to rotate freely.

3 Claims, 12 Drawing Sheets

PATRONE WITH SELECTIVE LOCKING MEANS AND CAMERA USABLE THEREWITH

BACKGROUND OF THE INVENTION

1. Field of the Invention

The present invention relates to a Patrone and a camera using the Patrone. More particularly, this invention is concerned with a Patrone having a mechanism that disables film, which is stored in the form of a roll in the. Patrone, from being wound in or fed from the Patrone unexpectedly, and a camera using the Patrone.

2. Description of the Related Art

FIG. 21 shows a known conventional Patrone used in general; that is, a Patrone 70 in which photographic film of 35 mm width is wound about an internal spool in roll form.

The Patrone 70 has a cylindrical body 71 whose top and bottom are sealed shut up to intercept light tightly. A film wind spool 72 provided in the Patrone 70 is freely rotatable therein Photographic film of 35 mm width is wound about the spool 72 and stored in the Patrone 70. A film port 71a is formed like a slit on the circumference of the cylindrical body 71 along the center axis of the cylindrical body 71. A leader 73 of the photographic film is shown coming out of the film port 71a. The unexposed photographic film stored in the Patrone 70 is loaded in a camera with the leader 73 pulled out of the film port 71a.

The Patrone 70 does not have a mechanism that when the Patrone 70 exists as a sole unit, locks the internal film. The spool 72 about which the film is wound may therefore rotate unexpectedly to wind the leader into the Patrone 70. After photography, in general, exposed film is rewound into the Patrone 70 and the leader 73 alone is exposed outside the Patrone as it initially is. When the Patrone 70 is demounted from a camera with the leader 73 pulled out of the film port 71a, the leader 73 may be pulled unexpectedly. This causes the exposed film to come out. The photographed film is thus exposed.

In efforts to resolve these drawbacks, various proposals have been made in the past. For example, as disclosed in Japanese Laid-open Patent Application No. 2-114257, a sprocket is placed in a Patrone to form a mechanism for locking film. When film is unused, the sprocket is used to lock a perforation formed on a side edge of the film in the vicinity of a film port. When the film is used, the lock is released so that the film will not be pulled in or out of the Patrone. According to the disclosure in Japanese Laid-open Patent Application No. 2-214854, a fitting hole is bored in the vicinity of a film port in a Patrone. When film is unused, a locking chip is locked in the fitting hole to prevent movement of film. When the film is used, the lock is released so that the film will not be pulled in or out of the Patrone unexpectedly.

A conventional means as that disclosed in the No. 2-114257 or No. 2-214854 publication is locked in a perforation of film or an engagement hole bored in a side edge of film. This causes the film to bear a large load. When the strength of film deteriorates at a cool or cold season, the film may be damaged. Furthermore, since the side edge of film is locked, such a drawback arises that a Patrone becomes large.

SUMMARY OF THE INVENTION

A major object of the present invention is to provide a Patrone that eliminates the drawbacks of the aforesaid kind of conventional Patrone, and that does not damage film, is not large in size, and is not hard to handle.

Another object of the present invention is to provide a Patrone including a locking means that lies in the Patrone so as to be displaced freely relative to a film wind spool, and that when the Patrone exists as a sole unit, locks the rotation of the spool.

Yet another object of the present invention is to provide a camera using a Patrone which includes a locking means that when the Patrone exists as a sole unit, locks the rotation of a film wind spool, and including a means that when the Patrone is mounted in the camera, releases the locking capability from the locking means.

Briefly, the present invention comprises a Patrone, which consists of a cylindrical body for storing film so that the film can move in and out freely and intercepting light tightly, a roll of photographic film wound about the spool, locking means that lie in the cylindrical body so as to be displaced freely relative to the spool, and whose ends are projecting outside, locked means that are opposed to the locking means and formed substantially as parts of the cylindrical body or spool, and an elastic member that urges each of the locked means into engaging with a locking means; and in a normal state, uses the locking means to disable the spool from rotating; and a camera which uses the Patrone and includes a means that, when the Patrone is mounted in the camera, releases the locking capability of from the locking means.

The above and either objects and advantages of the present invention will be apparent from the detailed description below.

According to the present invention, when a Patrone exists as a sole unit, a locking means engages with a locked means to lock the rotation of a spool. This prevents a leader from being wound in or pulled out because of unexpected handling. Furthermore, since the spool is locked but film is not locked directly, the leader will not bear a large load. Even when the strength of film deteriorates at a cool or cold season, the film will not be damaged. Moreover, the Patrone can be realized with a relatively simple structure and need not be large in size.

DETAILED DESCRIPTION OF THE PREFERRED EMBODIMENTS

Figure 1:
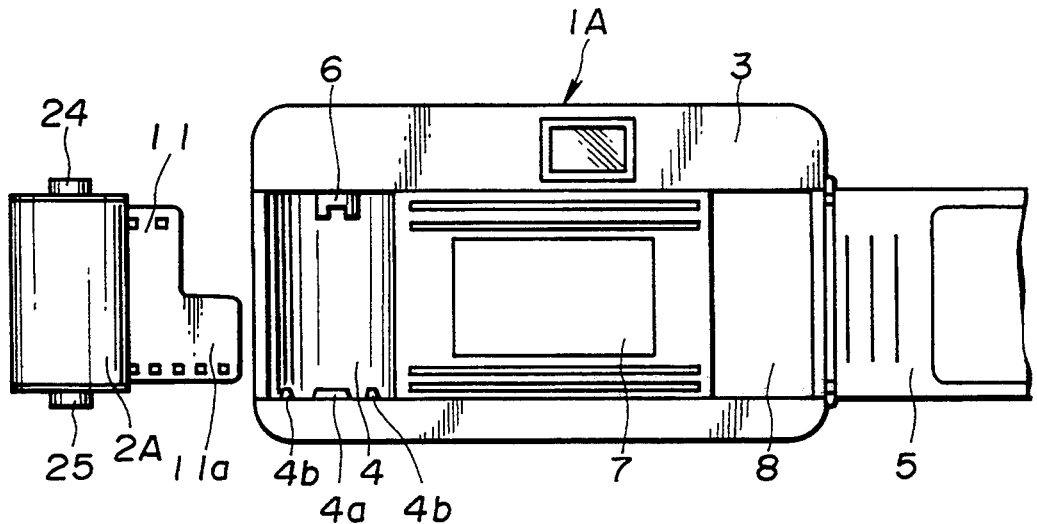
FIG. 1 is a back view of a camera in which a Patrone representing the first embodiment of the present invention is mounted.
Figure 2:
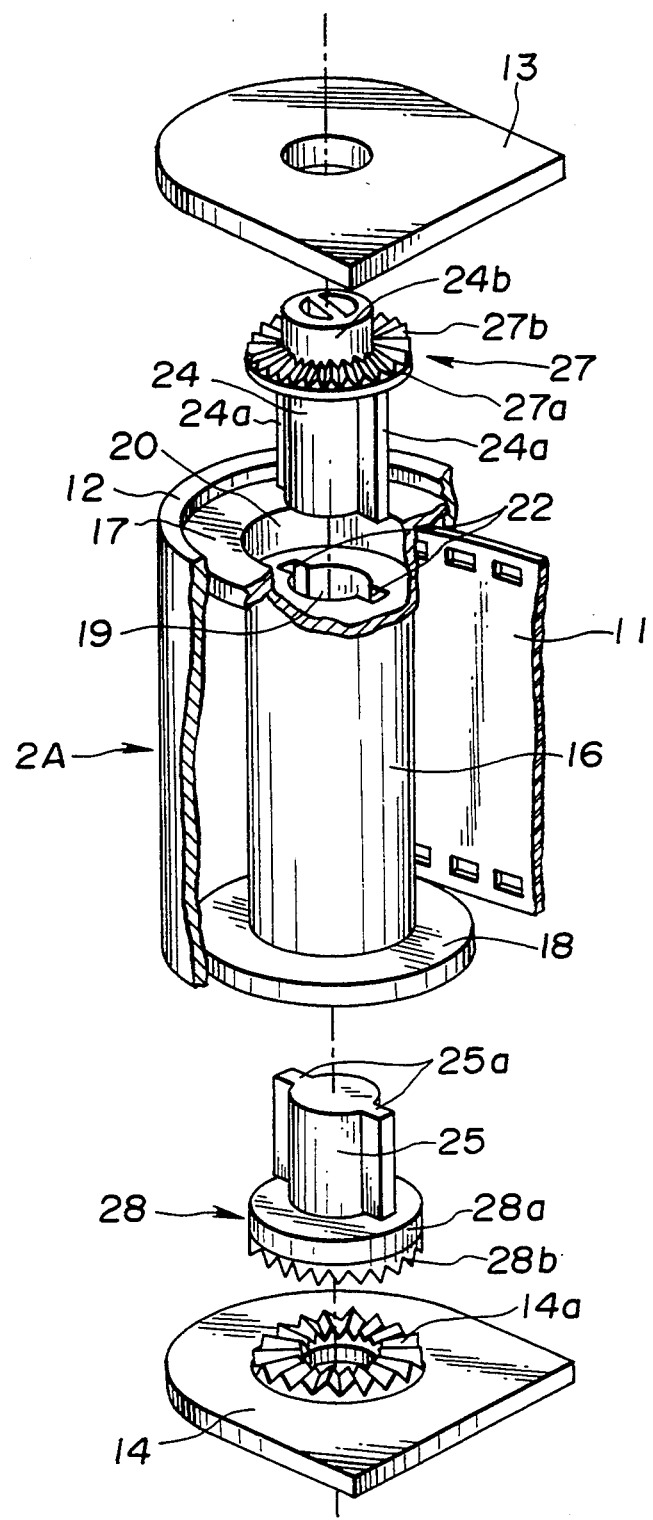
FIG. 2 is an exploded oblique view of a Patrone representing a first embodiment of the present invention.

In a camera 1A shown in FIG. 1, a Patrone 2A representing the first embodiment of the present invention is mounted. The camera 1A has the same components as a standard camera except that a spool pressure projection 4a for unlocking and a Patrone mounting projection 4b are formed in the center of the bottom of a Patrone chamber 4 therein. Mounting the Patrone 2A in the Patrone chamber 4 is performed similar to that in a standard camera. To be more specific, a back cover 5 on the back of a camera body 3 is opened, and then the Patrone 2A is mounted in the Patrone chamber 4 that is located by the side of an aperture 7 formed in the center of the camera body 3. During the mounting, a fork of a film rewind axis 6, which lies in the center of the ceiling of the Patrone chamber 4 so as to freely project toward the inside of the Patrone chamber 4, engages with a spool rotation axis 24, which will be described later (See FIGS. 2, 3, and 4), of the Patrone 2A, and presses the spool rotation axis 24. A film take-up chamber 8 is formed by the other side of the aperture 7.

As for the Patrone 2A used for the camera 1A, as shown in FIGS. 2 to 5, the top and bottom openings of a cylindrical body 12, which stores film 11 so that the film 11 can move in or out freely, are sealed with Patrone covers 13 and 14 to intercept light tightly. A spool 15 lies in the Patrone 2A so as to rotate freely.

Figure 5:
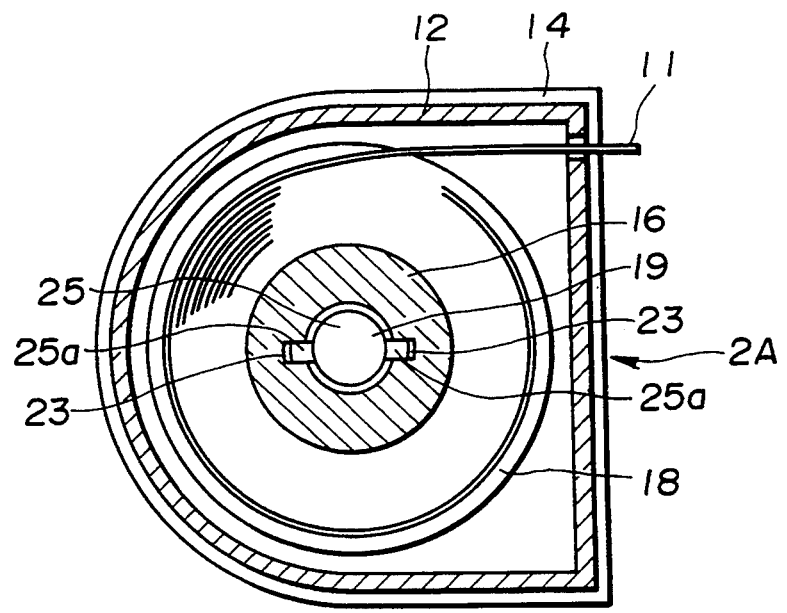
FIG. 5 shows a cross section of the Patrone looking in the direction of arrows 5—5 in FIG. 3.
Figure 6:
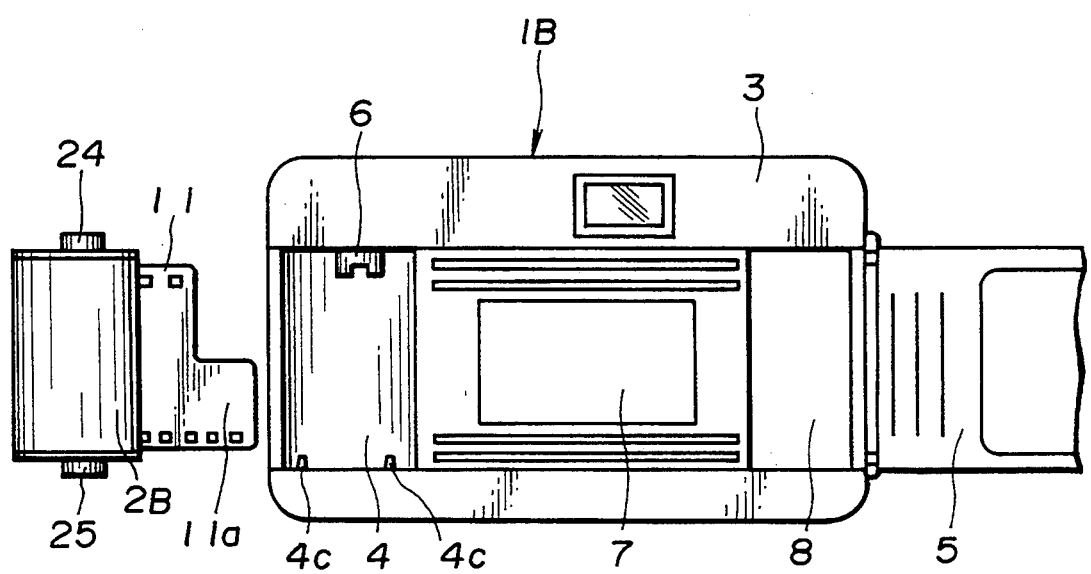
FIG. 6 is a back view of a camera in which a Patrone representing a second embodiment of the present invention is mounted.
Figure 7:
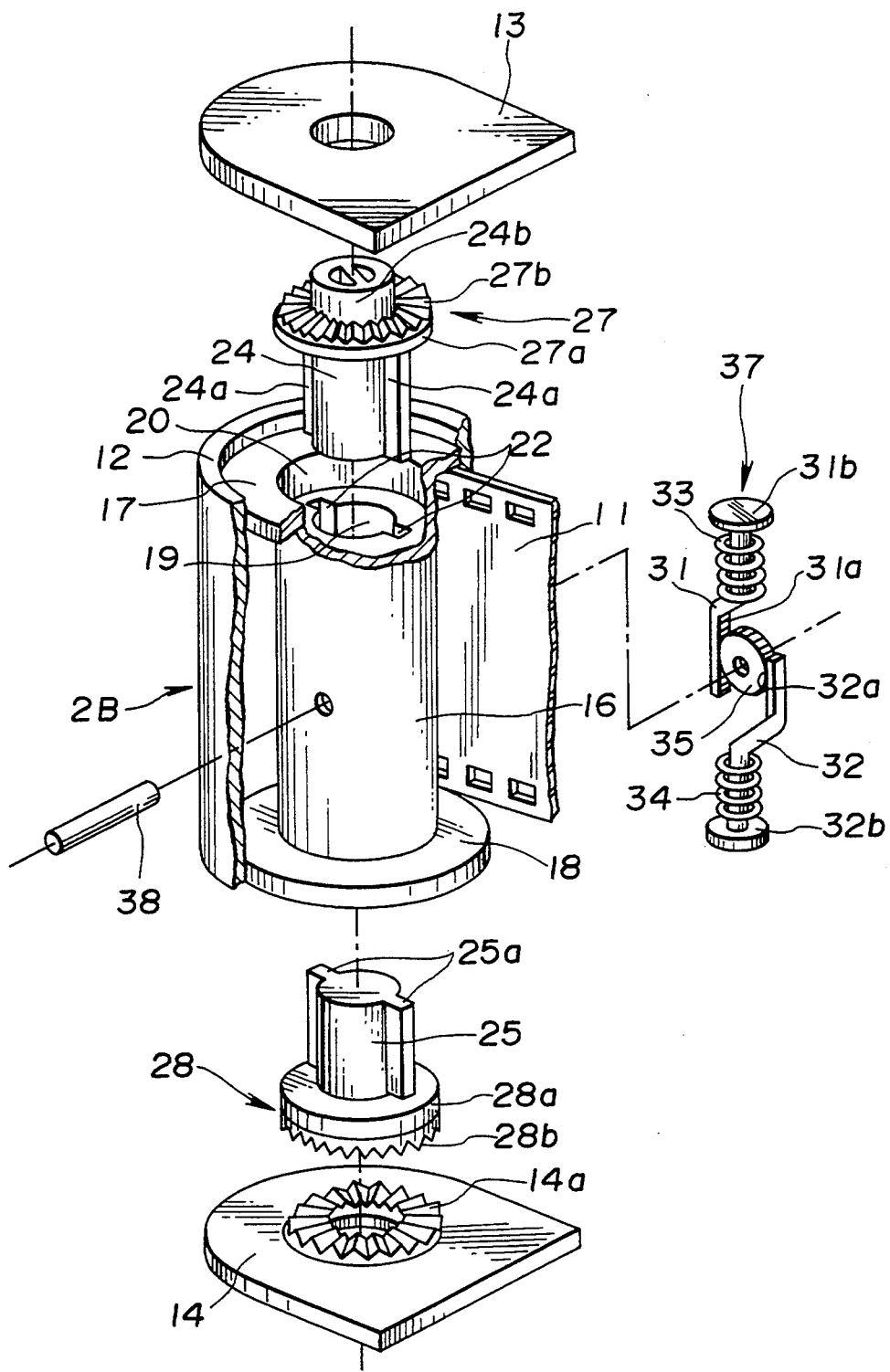
FIG. 7 is an exploded oblique view of the Patrone representing the second embodiment of the present invention.

The cylindrical body 12 is shaped like a combination of a semi-cylinder and a semi-prism (See FIG. 5).

The spool 15 consists of a spool axis 16 that is a tube axis about which the film 11 is wound in the form of a roll, and outgoing flanges 17 and 18 that are united with the upper and lower ends of the spool axis 16. Large-diameter holes 20 and 21 are formed symmetrically in the upper and lower parts of a central through hole 19.

Key ditches 22 or 23 extend vertically from the large-diameter hole 20 or 21 along the central through hole 19 and are located symmetrically across the axis of the central through hole 19.

Spool rotation axes 24 and 25 each having a locking member are fitted in the large-diameter holes 20 and 21 in such a manner that they can move freely vertically (axially). The spool rotation axes 24 and 25 are short axes which are fitted in the upper and lower parts of the central through hole 19 in such a manner that they can move freely and axially. Keys 24a and 25a are formed at symmetrical positions on the circumferences of the inner parts of the spool rotation axes 24 and 25, so that the keys 24a and 25a will rotate together with the spool axis 16. Locking members 27 and 28 are united with the outer parts of the spool rotation axes 24 and 25. The locking member 27 or 28 consists of an outgoing flange 27a or 28a that is relatively thick and an irregular locking section 27b or 28b that is formed radially on the outer end surface of the flange 27a or 28a.

The locking section 27b or 28b has a chrysanthemum structure in which a crest having a triangular cross section and a groove having a triangular cross section are formed alternately in the radial direction.

The inner surface of the Patrone cover 13 or 14 opposed to the locking section 27b or 28b has a locked member 13a or 14a whose shape and size are exactly like those of the locking section. The locking section 27b or 28b engages with the irregular locking section of the locked member 13a or 14a. Each of the locking members and locked members is a kind of claw clutch.

The spool rotation axes 24 and 25 formed as mentioned above are pressed outward with the stretching spring force of an elastic member 26 that is a coil spring placed in the central through hole 19. Heads 24b and 25b of the spool rotation axes 24 and 25 are largely projecting outside of the covers 13 and 14. Engagement holes are bored in the heads 24b and 25b so that they will be engaged with the fork of the film rewind axis 6 projecting toward the inside of the Patrone chamber 4, and so on.

Figure 3:
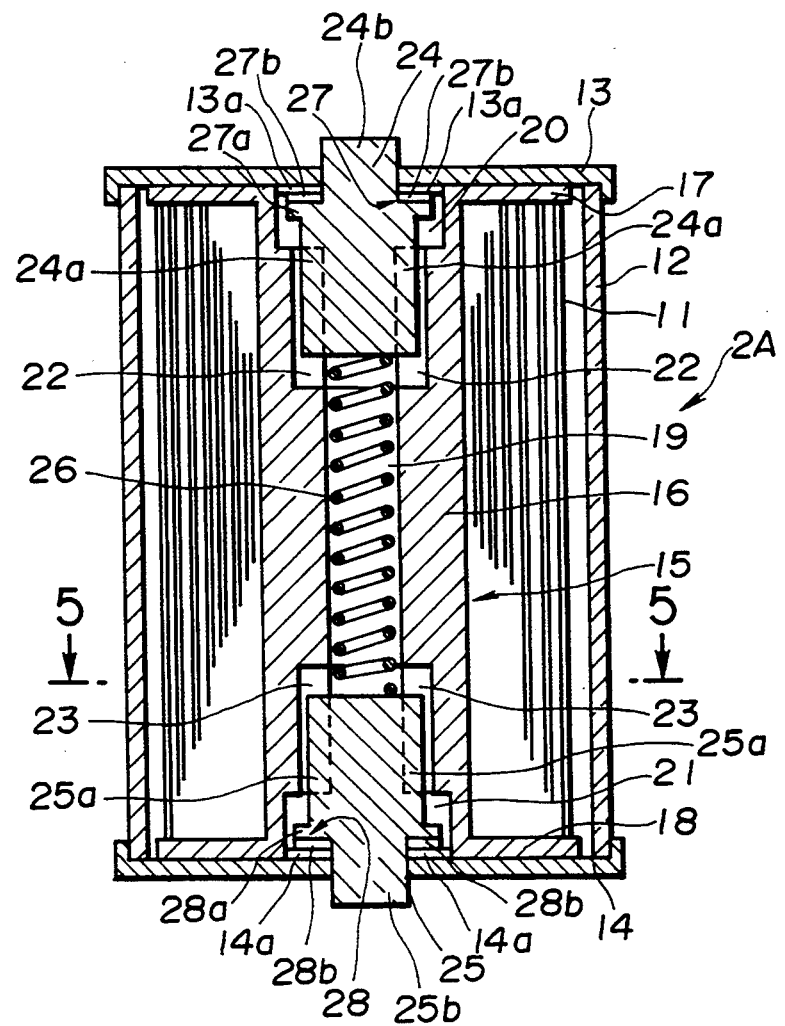
FIG. 3 shows an enlarged longitudinal section of the Patrone of the first embodiment.

In the Patrone 2A of the first embodiment having the aforesaid components, when the Patrone 2A exists as a sole unit or is not mounted in the Patrone chamber 4 in the camera body 3, as shown in FIG. 3, no external pressing force is not applied to the spool rotation axes 24 and 25. The spool rotation axes 24 and 25 are therefore pressed outward by the elastic member 26. The irregular locking sections 27b and 28b of the spool rotation axes 24 and 25 engage with the irregular locking sections of the locked members 13a and 14a on the Patrone covers 13 and 14, which disables the spool rotation axes 24 and 25 from rotating. The spool axis 16 that rotates together with the spool rotation axes 24 and 25, or eventually the spool 15, is locked in the Patrone covers 13 and 15 which are united with the cylindrical body 12. This prevents the film 11 from being pulled in or out.

Figure 4:
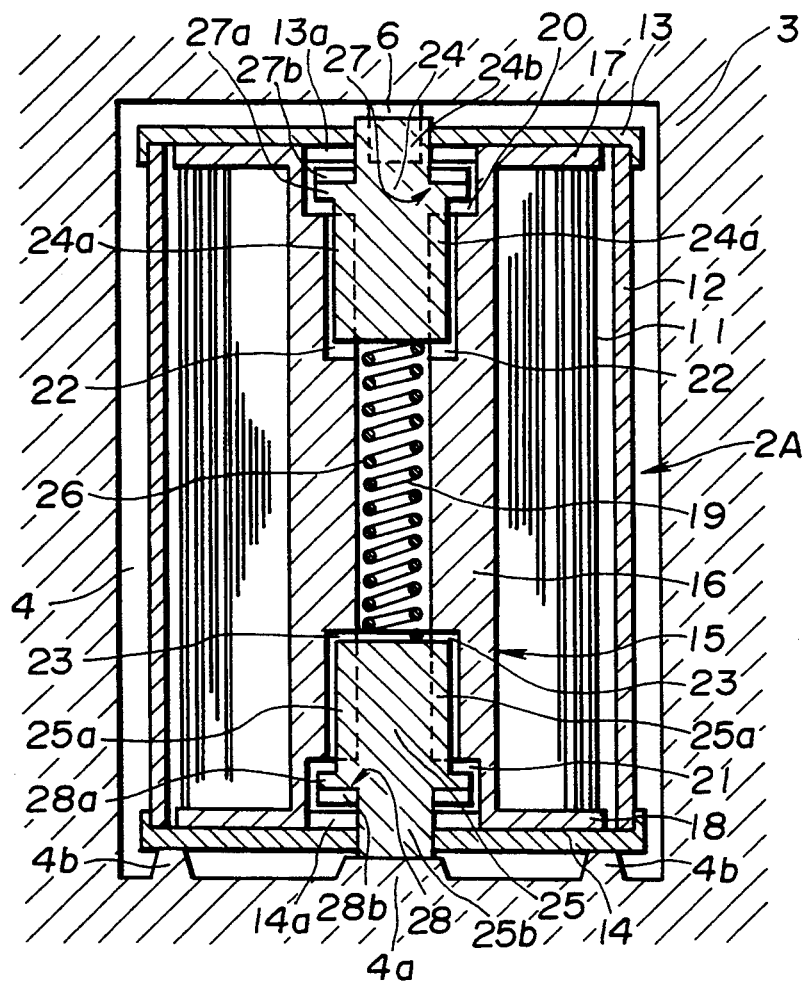
FIG. 4 shows an enlarged longitudinal section of the Patrone of the first embodiment mounted in a camera.

When the Patrone 2A is mounted in the Patrone chamber 4 in the camera 1A, as shown in FIG. 4, the head 24b of the spool rotation axis 24 is pressed inward by the film rewind axis 6 on the camera body 3, while the head 25b of the spool rotation axis 25 is pressed inward by the spool pressure projection 4a on the bottom of the Patrone chamber in the camera body 3. The irregular locking sections 27b and 28b of the spool rotation axes 24 and 25 are then disengaged from the locked members 13a and 14a on the Patrone covers 13 and 14.

The spool rotation axes 24 and 25, or eventually, the spool 15 is enabled to rotate. When the Patrone is mounted in a camera film wind or rewind can be performed free of care in the same manner as that when a conventional Patrone is mounted.

FIGS. 6 to 9 show a camera 1B and a Patrone 2B in the second embodiment of the present invention.

The camera 1B in the second embodiment has the same components as the camera 1A in the first embodiment except that a Patrone mounting projection 4c alone is formed on the bottom of the Patrone chamber 4. The components are therefore assigned the same reference numerals as those in the first embodiment, of which detailed description will be omitted. The components of the Patrone 2B in the second embodiment identical to those of the Patrone 2A in the first embodiment will bear the same reference numerals. Only the differences in FIGS. 6 to 9 will be described in detail.

The foregoing rule concerning reference numerals applies to the embodiments which will be described later.

The Patrone 2B in the second embodiment differs from the Patrone 2A in the first embodiment in a displacement mechanism for the spool rotation axes 24 and 25. In the aforesaid first embodiment, the spool rotation axes 24 and 25 are pressed independently of each other. In the second embodiment, the spool rotation axes 24 and 25 are interlocked with each other. That is to say, when either of the spool rotation axes 24 and 25 is pressed, the other spool rotation axis also moves. The spool rotation axes 24 and 25 are joined together by means of a coupling mechanism 37.

The coupling mechanism 37 for joining the spool rotation axes 24 and 25 together comprises a connecting rod 31 for moving the spool rotation axis 24 vertically, a connecting rod 32 for moving the other spool rotation axis 25 vertically, a pinion gear 35 for coupling the connecting rods 31 and 32, and coil springs 33 and 34 that are elastic members for urging the connecting rods 31 and 32 to move outward.

The pinion gear 35 is attached to a gear support axis 38 so that it can rotate freely. The gear support axis 38 penetrates through the middle of the spool axis 16 and is held to perpendicularly cross the central axis, Racks 31a and 32a formed on opposed surfaces of the inner parts of the connecting rods 31 and 32 engage the gear 35 at laterally symmetrical positions of the gear 35.

The connecting rods 31 and 32 are crank-like bar members. The racks 31a and 32a are formed on the inner parts of the connecting rods 31 and 32. Disk-like connecting plates 31b and 32b are united with the outer ends of the connecting rods 31 and 32. The connecting plates 31b and 32b are attached to the centers of the inner end surfaces of the spool rotation axes 24 and 25, and pressed outward with the stretching spring forces of the coil springs 33 and 34 that lie in a small-diameter hole in the central through-hole 19. The remaining components, other than the foregoing ones, are identical to those in the first embodiment.

Figure 8:
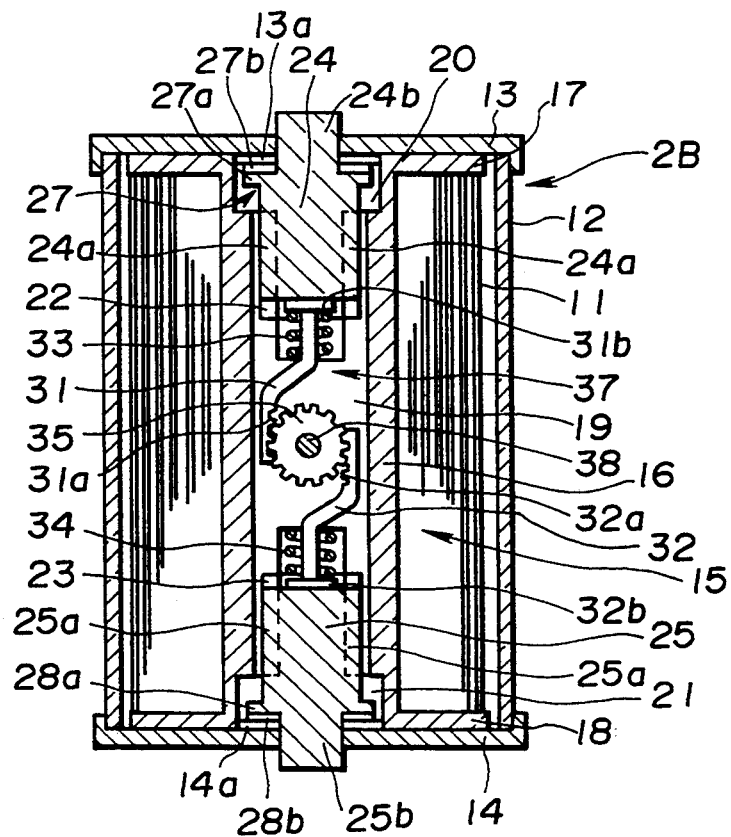
FIG. 8 is an enlarged longitudinal section of the Patrone of the second embodiment.

In the second embodiment having the aforesaid components, when the Patrone 2B exists as a sole unit or is not mounted in the Patrone chamber 4 in the camera body 3, as shown in FIG. 8, no external pressing force is applied to the spool rotation axes 24 and 25. The spool rotation axes 24 and 25 are therefore pressed outward by the coil springs 33 and 34. The irregular locking sections 27b and 28b of the spool rotation axes 24 and 25 engage with the irregular locking sections of the locked members 13a and 14a on the Patrone covers 13 and 14, which disables the spool rotation axes 24 and 25 from rotating. The spool axis 16 that rotates together with the spool rotation axes 24 and 25 is therefore locked, preventing the film 11 from being pulled in or out.

Figure 9:
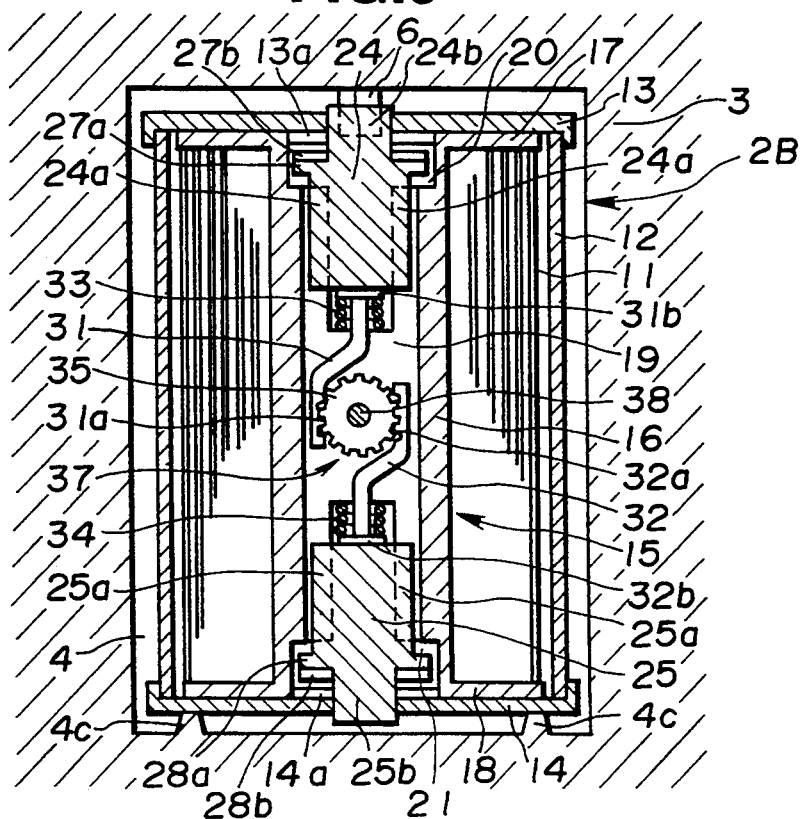
FIG. 9 is an enlarged longitudinal section of the Patrone of the second embodiment mounted in a camera.

When the Patrone 2B is mounted in the Patrone chamber 4 in the camera 1B, as shown in FIG. 9, the head 24b of the spool rotation axis 24 is pressed down by the film rewind axis 6 in the camera body 3. The spool rotation axis 24 then moves inward against the spring force of the spring 33. With this movement, the connecting rod 31 moves down. This causes the pinion gear 35 engaging with the rack 31a to rotate. The other connecting rod 32 engaging with the gear 35 then moves inward against the spring force of the spring 34. The other spool rotation axis 25 then moves inward. Consequently, the irregular locking sections 27b and 28b of the spool rotation axes 24 and 25 are disengaged from the locked members 13a and 14a on the Patrone covers 13 and 14. The spool rotation axes 24 and 25, or eventually, the spool 15 is enabled to rotate. When the Patrone is mounted in a camera, film wind or rewind can be done free of care in the same manner as that when a conventional Patrone is mounted.

In the aforesaid first embodiment, unless the upper and lower spool rotation axes 24 and 25 are pressed, the irregular locking sections 27b and 28b are not disengaged from the locked members 13a and 14a. The spool rotation axes 24 and 25 can therefore not rotate. In the second embodiment, when either of the upper and lower spool rotation axes 24 and 25 is pressed, the spool 15 is unlocked and then enabled to rotate.

Figure 10:
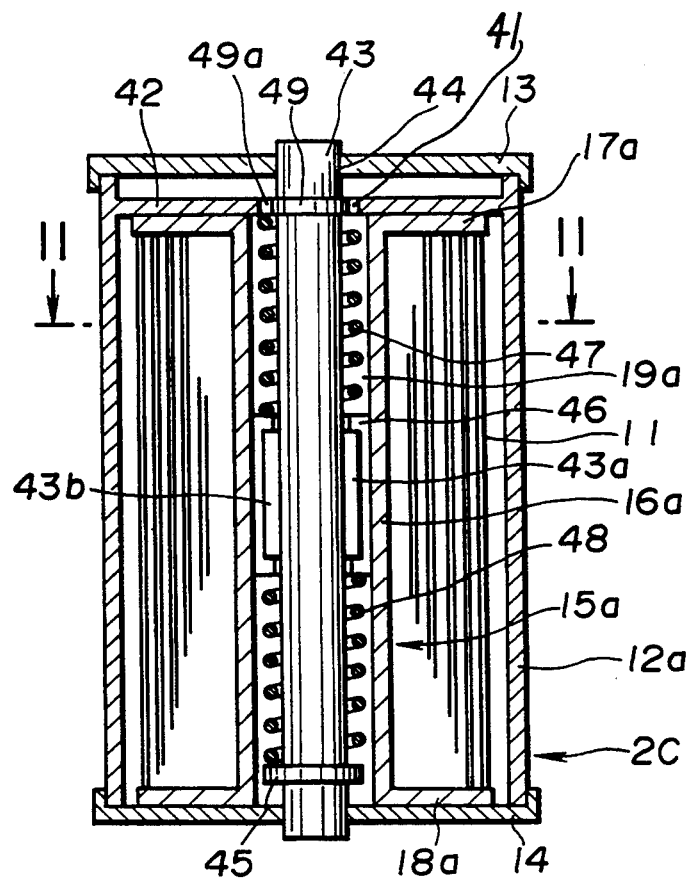
FIG. 10 is an enlarged longitudinal section of a Patrone of a third embodiment.
Figure 11:
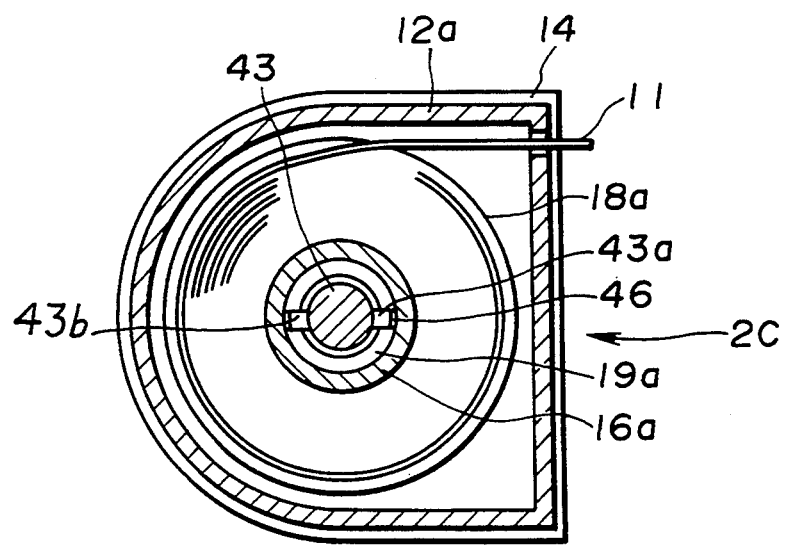
FIG. 11 is cross section of a Patrone looking in the direction of arrows 11—11 of FIG. 10.
Figure 12:
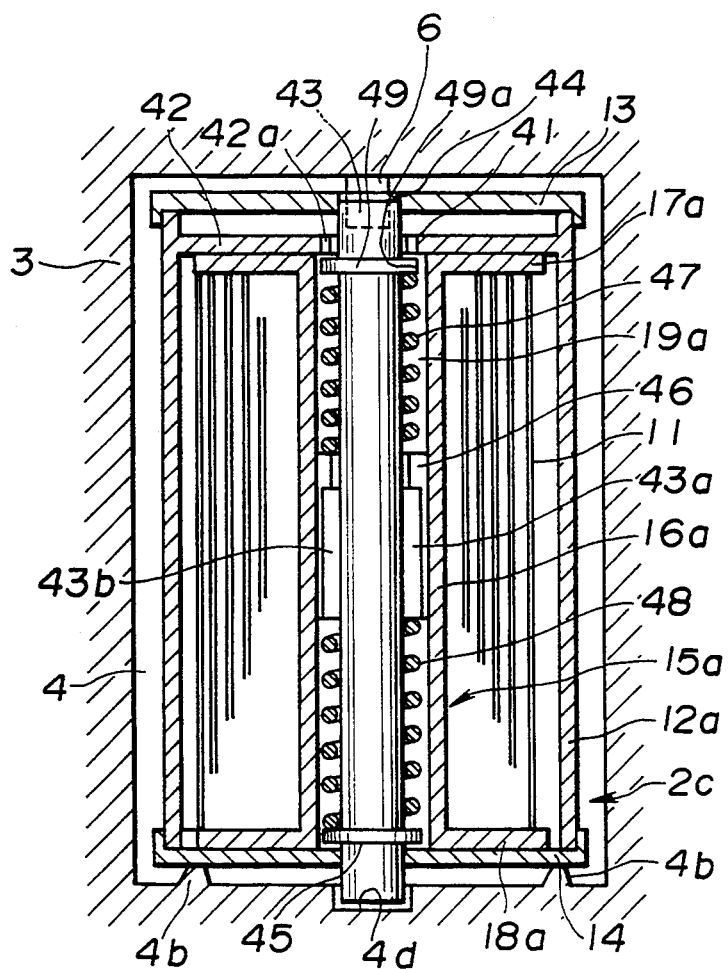
FIG. 12 is an enlarged longitudinal section of the Patrone of the third embodiment mounted in a camera.
Figure 13:
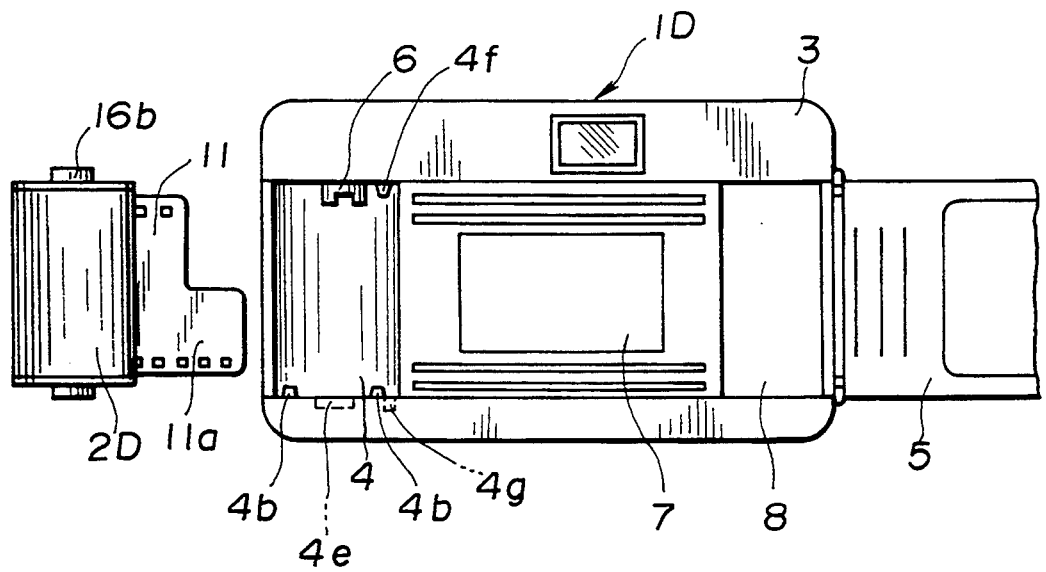
FIG. 13 is a back view of a camera in which a Patrone representing a fourth embodiment of the present invention is mounted.

FIGS. 10 to 12 show the third embodiment of the present invention.

A camera in the third embodiment is not illustrated, but has the same components as the camera 1A shown in FIG. 1 except that a recess 4d (See FIG. 12) is employed instead of the spool pressure projection 4a for unlocking which is formed in the center of the bottom of the Patrone chamber 4.

In a Patrone 2C of the third embodiment which is to be mounted in the above camera, a top plate 42 is formed as part of a cylindrical body 12a immediately below the Patrone cover 13 in the vicinity of the top of the cylindrical body 12a. The top plate 42 is used to form a locked member. A locked member 42a (See FIG. 12), which is an irregular locked section such as an inner gear, is formed on the inner circumferential surface of a circular hole 41 bored in the center of the top plate 42. The spool rotation axis 43 is formed with a single axial member, and running through a central through hole 19a of a spool 15a so that it can move vertically freely. The upper part of the spool rotation axis 43 penetrates through the circular hole 41 and a circular hole 44 (See FIG. 12) bored in the Patrone cover 13. The lower part thereof penetrates through a central circular hole of the Patrone cover 14. The upper and lower parts thereof project outside of the covers 13 and 14. The spool 15a consists of a spool axis 16a that is a tubular axis, and outgoing flanges 17a and 18a united with the upper and lower ends of the tube axis.

Keys 43a and 43b are formed at symmetrical positions in the middle of the outer circumferential surface of the spool rotation axis 43. The keys 43a and 43b are fitted in key ditches 46 in a pair of semi-cylindrical sections formed coaxially in the middle of the inside of the spool axis 16a as parts of the inside thereof. Owing to the key ditches 46 and the keys 43a and 43b, the spool rotation axis 43 and spool axis 16a rotate together.

A disk-like locking member 49 that has an irregular locking section 49a shaped like gear teeth on the outer circumferential surface thereof is united with the upper part of the spool rotation axis 43. The irregular locking section 49a on the locking member 49 engages with or disengages from the locked member 42a. A disk-like stopper 45 is fixed to the lower part of the spool rotation axis 43 for fear that the spool rotation axis 43 should come off downward.

Elastic members 47 and 48, which are coil springs, are interposed between the locking member 49 and key ditch forming members, and the stopper 45 and key ditch forming members respectively. The elastic members 47 and 48 are balanced normally, whereby the spool rotation axis 43 is held at a position at which the irregular locking section 49a of the locking member 49 engages with the locked member 42a.

In the third embodiment having the aforesaid components, when the Patrone 2C exists as a sole unit or is not mounted in the Patrone chamber 4 in the camera body 3, as shown in FIG. 10, no external pressing force is applied to the spool rotation axis 43. The tensile forces of the elastic members 47 and 48 are therefore balanced, which causes the locking member 42a and irregular locking section 49a to engage each other. The spool rotation axis 43 is therefore disabled from rotating. The spool 15a therefore does not rotate, thus preventing the film 11 from being pulled in or out of the Patrone.

When the Patrone 2C is mounted in the Patrone chamber 4 in a camera, as shown in FIG. 12, the spool rotation axis 43 is pressed by the film rewind axis 6 in the camera body. This causes the spool rotation axis 43 to move downwardly from the position shown in FIG. 10. The locked member 42a and irregular locking member 49a are then disengaged from each other, which enables the spool 15a to rotate. When the Patrone is mounted in a camera, film wind of rewind can be done free or care in the same manner as that when a conventional Patrone is mounted.

In the third embodiment, when the upper end of the spool rotation axis 43 is pressed down, the spool rotation axis 43 is unlocked and the spool 15a is enabled to rotate. At this time, the lower end of the spool rotation axis 43 projects downward by a magnitude by which the upper end thereof is pressed down.

Depending on the structure of a Patrone or a Patrone chamber, the Patrone 2C must be mounted in the Patrone chamber by starting with the locking member 49 or the stopper 45 thereof. In the third embodiment, at whichever of the upper and lower ends the spool rotation axis 43 is pressed, the spool rotation axis 43 can move axially. Even when the Patrone 2C is mounted in a Patrone chamber by starting with the stopper 45 thereof, the locked member 42a and irregular locking section 49a can be disengaged from each other.

FIGS. 13 to 16 show the fourth embodiment of the present invention.

In a camera 1D in the fourth embodiment, a positioning hole 4e, in which the lower end of a spool axis 16b in a Patrone 2D is fitted, is formed in the center of the bottom of the Patrone chamber 4. Patrone mounting projections 4b are formed around the positioning hole 4e. An unlocking pressure projection 4f is formed on the ceiling of the Patrone chamber 4 near the aperture 7. A recess 4g is formed on the bottom of the Patrone chamber 4 and opposed to the pressure projection 4f. The other components are identical to those in the camera 1A shown in FIG. 1.

Figure 14:
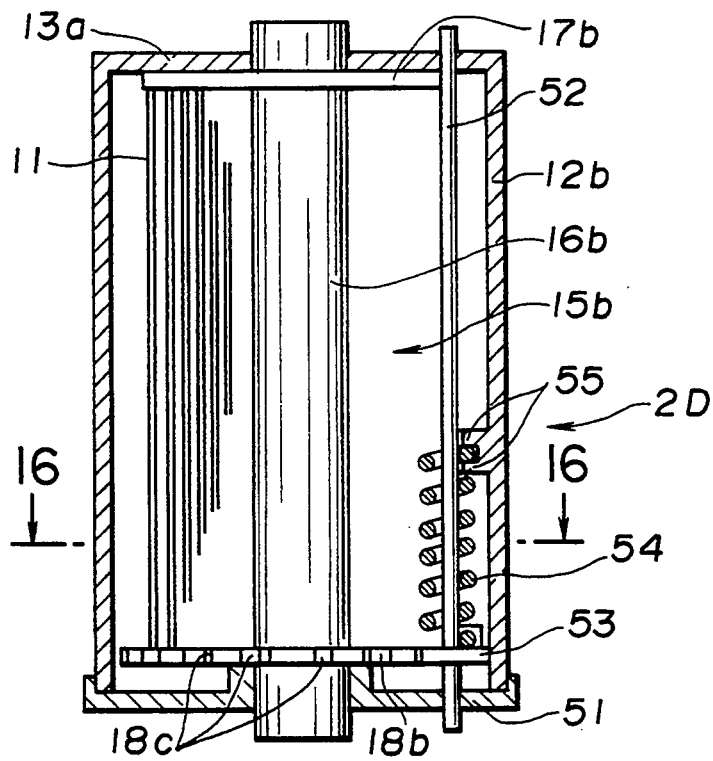
FIG. 14 is an enlarged longitudinal section of the Patrone of the fourth embodiment.
Figure 15:
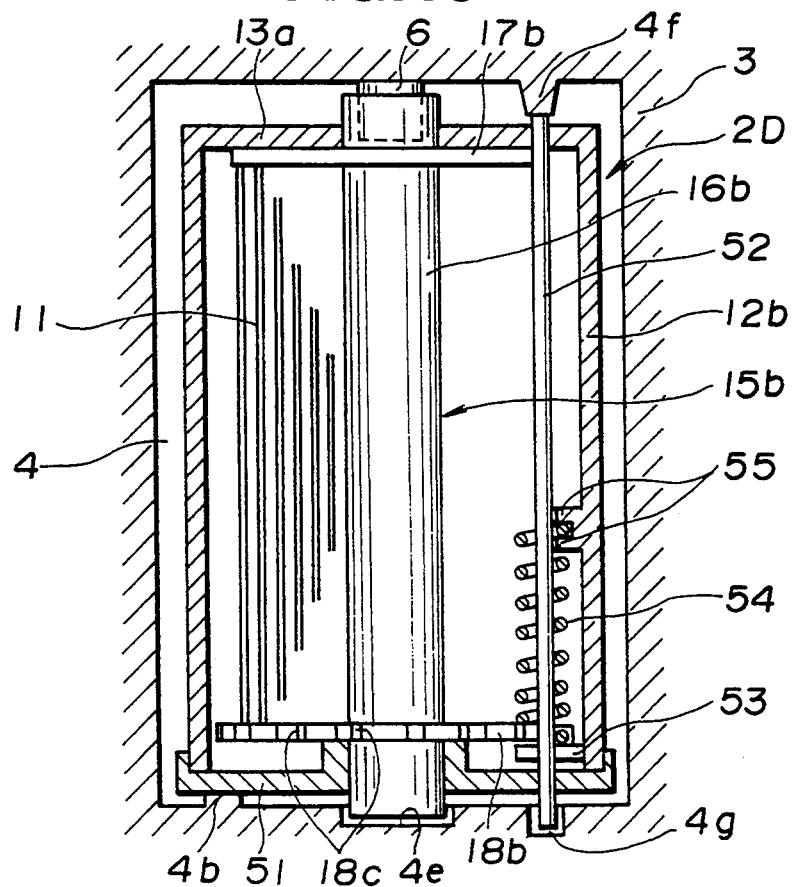
FIG. 15 is an enlarged longitudinal section of the Patrone of the fourth embodiment mounted in a camera.
Figure 16:
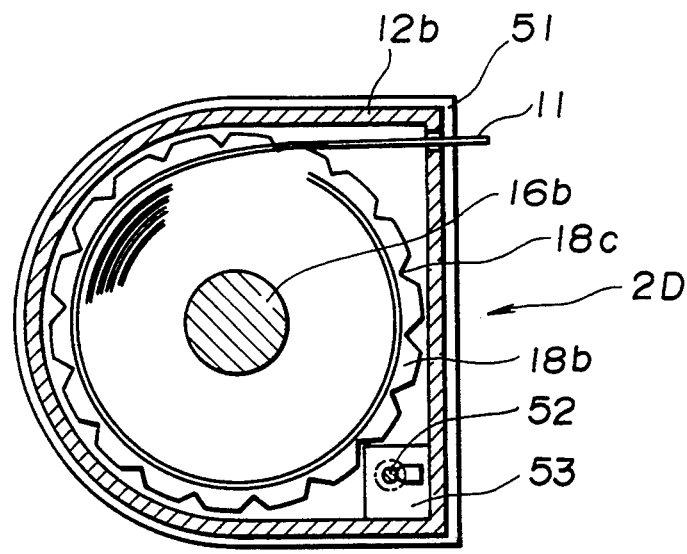
FIG. 16 is cross section of a Patrone looking in the direction of arrows 16—16 of FIG. 14.

In the Patrone 2D of the fourth embodiment which is to be mounted in the camera 1D, as shown in FIGS. 14 and 15, a top 13a of a cylindrical body 12b for storing the film 11 so that the film 11 can move in or out freely is formed as part of the cylindrical body 12b. The bottom opening thereof is sealed with a Patrone cover 51. A spool 15b lies in the cylindrical body 12b so as to rotate freely.

The spool 15b consists of a spool axis 16b that is a tubular axis about which the film 11 is wound in the form of a roll, and outgoing flanges 17b and 18b that are united with the upper and lower ends of the spool 16b. A locked member that cooperates with a locking chip 53 to be described later is formed on the circumference of the lower outgoing flange 18b. The locked member is realized with multiple notches 18c (See FIG. 16) that are formed by notching the outer circumference of the lower outgoing flange 18b, which is a larger disk than the upper outgoing flange 17b, at regular intervals in the form of a triangle.

A locking/unlocking mechanism is incorporated in the area near the outside or corner of the Patrone 2D so that when the Patrone 2D is mounted in the Patrone chamber 4, said mechanism adjoins the aperture 7. The mechanism consists of a lock bar 52 that lies parallel to the spool axis 16b and extends into the top 13a of the cylindrical body 12b and the Patrone cover 51 serving as the bottom thereof, the locking chip 53 being united with the lower part of the lock bar 52, and a coil spring 54 wound about the lock bar 52 above the locking chip 53. One end of the spring 54 is fixed to a projection 55 formed in the middle of the inner wall of the cylindrical body 12b of the Patrone, and the other end thereof is fixed to the locking chip 53. The locking chip 53 is a square plate and arranged so that two adjoining sides thereof will abut on the inner wall surface of the Patrone at one corner thereof and the other sides thereof will engage with any of the notches 18c when the spring 54 assumes its natural length.

In the fourth embodiment having the aforesaid components, when the Patrone 2D exists as a sole unit or is not mounted in the Patrone chamber 4 in the camera body 3, as shown in FIG. 14, no external pressing force is applied to the lock bar 52. The spring 54 maintains its natural length, and the locking chip 53 and notch 18c engage with each other. This disables the spool axis 16b from rotating. The spool 15b is then locked, which prevents the film from being pulled in or out.

When the Patrone 2D is mounted in the Patrone chamber 4 in the camera, as shown in FIG. 15, the upper end of the lock bar 52 is pressed by the unlocking pressure projection 4f in the Patrone chamber 4. The lock bar 52 therefore moves down. The lower end of the lock bar 52 penetrates into the recess 4g. When the lock bar 52 moves down, the locking chip 53 united with the lock bar 52 also moves down. The locking chip 53 and notch 18c are disengaged from each other, enabling the spool 16b to rotate. When the Patrone 2D is mounted in the camera 1D, the spool 15b is unlocked to enable film to wind or rewind.

In the fourth embodiment, a lock bar, which lies in a Patrone so as to move freely, is engaged with spool flanges to disable a spool from rotating. When the Patrone is mounted in a camera, a pressing member in a camera body, which is not a film rewind axis, actuates the lock bar so that the lock bar will disengage from the spool flanges. The spool is then enabled to rotate.

FIGS. 17 to 20 show the fifth embodiment of the present invention.

Figure 17:
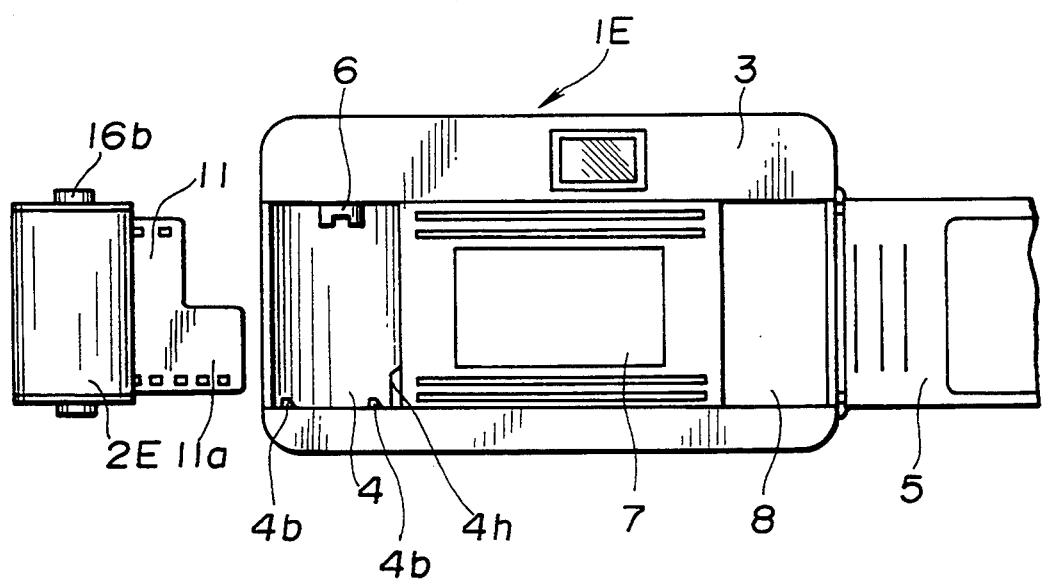
FIG. 17 is a back view of a camera in which a Patrone representing a fifth embodiment of the present invention is mounted.

A camera 1E in the fifth embodiment, as shown in FIG. 17, Patrone mounting projections 4b are formed on the bottom of the Patrone chamber 4. An unlocking pressure projection 4h is formed in the lower part of a side wall of the Patrone chamber 4 by the side of the aperture 7. The other components are identical to those of the camera 1A shown in FIG. 1.

Figure 18:
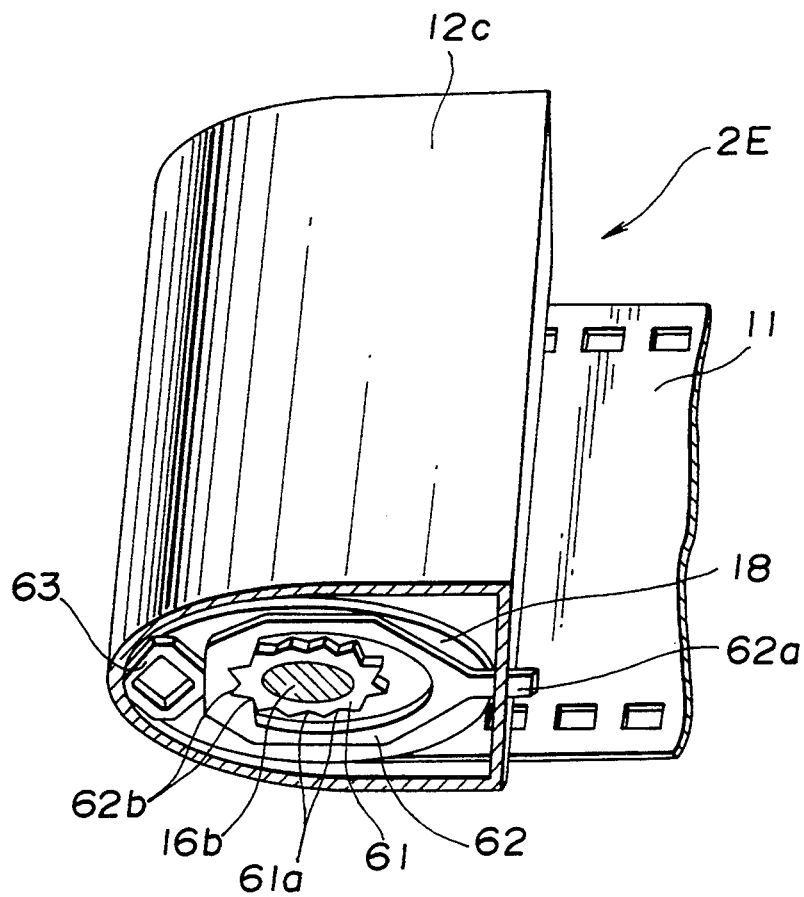
FIG. 18 is an exploded oblique view showing a section of a major portion of a Patrone representing the fifth embodiment of the present invention.
Figure 19:
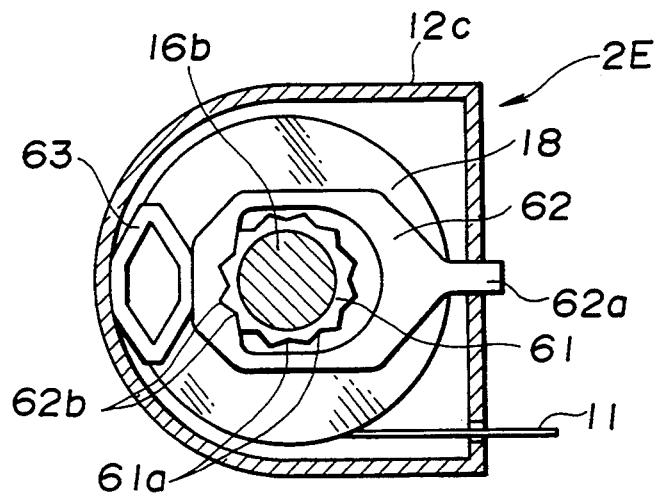
FIG. 19 is a bottom view of the Patrone of the fifth embodiment.
Figure 20:
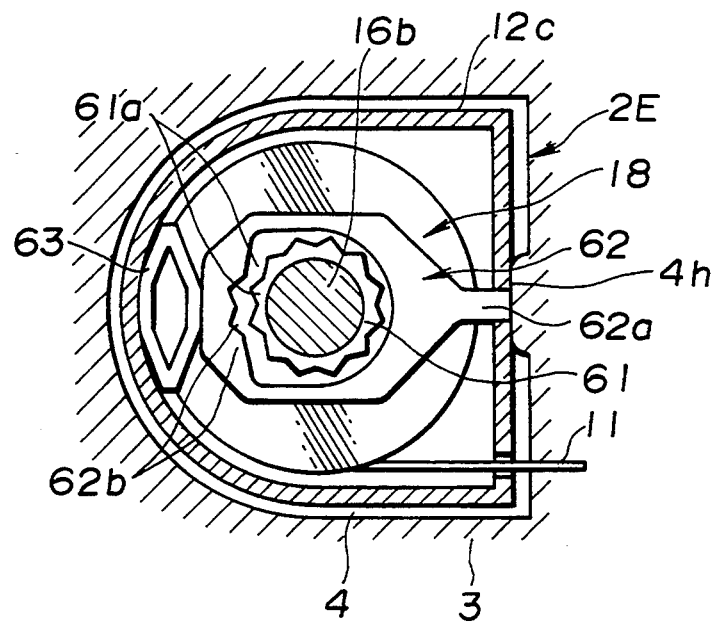
FIG. 20 is a bottom view of the Patrone of the fifth embodiment mounted in a camera.
Figure 21:
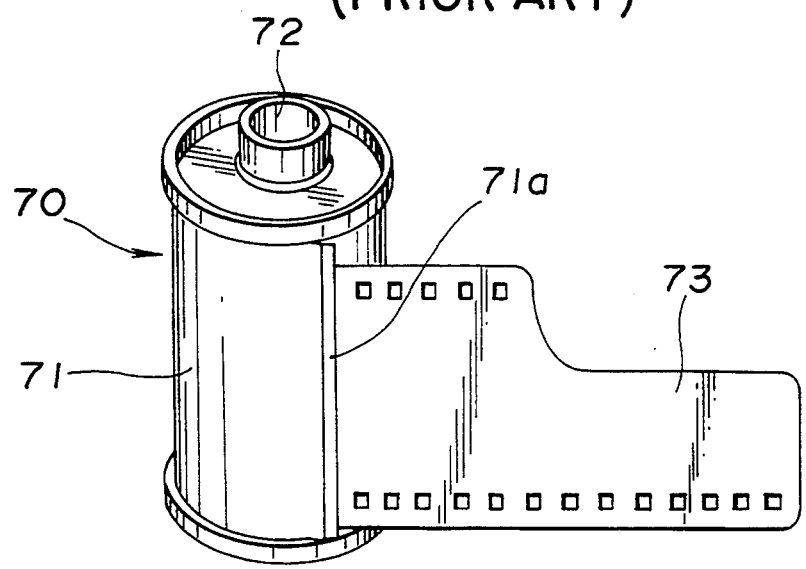
FIG. 21 is an oblique view showing a conventional Patrone.

As for a Patrone 2E in the fifth embodiment which is to be mounted in the camera 1E, as shown in FIGS. 18 to 20, a spool (not shown) is located in a cylindrical body 12c for storing the film 11 so that the film 11 can move in or out freely. A locking/unlocking mechanism for the spool is installed in the lower part of the spool. The bottom of the cylindrical body 12c is shielded with a Patrone cover which is not shown. The spool comprises a spool axis 16b that is a tubular axis about which the film 11 is wound in the form of a roll, an outgoing flange, which is not shown, united with the upper end of the spool 16b, and an outgoing flange 18 united with the lower end of the spool axis 16b. The locking/unlocking mechanism is installed on the bottom of the outgoing flange 18 at the lower end of the spool axis 16b.

The mechanism comprises a locked chip 61 that has an zigzagged irregular section 61a on the outer circumference thereof and is formed as part of the spool axis 16b, a locking chip 62 that is a substantially octagonal-shaped flat plate, and has a pressure projection knob 62a on one side thereof and an internal large opening around the locked chip 61, and a frame-like plate spring 63 for providing the locking chip 62 with a habit of projecting the pressure projection 62a outside. An irregular section 62b, which is to engage with an irregular section 61a of the locked chip 61, is formed on part of the inner circumferential surface of the opening of the locking chip 62 on the opposite side of the pressure projection knob 62a. The spring 63 is shaped like a hollowed rhombus and located between the outer circumferential surface of the locking chip 62 opposed to the irregular section 62b and the inner wall surface of the cylindrical body 12c so that the diagonal angles thereof will abut on the outer circumferential surface and inner wall surface.

In the fifth embodiment having the foregoing components, when the Patrone 2E exists as a sole unit or is not mounted in the Patrone chamber 4 in the camera body 3, as shown in FIGS. 18 and 19, a side of the locking chip 62 abutting on the spring 63 is pressed with the expanding spring force of the spring 63. The pressure projection 62a then projects outside the Patrone 2E. The irregular section 62b of the locking chip 62 engages with the irregular section 61a of the locked chip 61, disabling the spool 16b from rotating. The rotation of the spool is therefore locked, which prevents the film from moving.

When the Patrone 2E is mounted in the Patrone chamber 4 in the camera 1E shown in FIG. 17, the pressure projection knob 62a is pressed by the unlocking pressure projection 4h (See FIG. 20). The irregular section 62b of the locking chip 62 and the irregular section 61a of the locked chip 61 are disengaged from each other, enabling the spool 16b to rotate. Consequently, film wind or rewind can be done free of care.

In the fifth embodiment, a locking chip in a Patrone is engaged with a locked chip united with a spool axis so that a spool will not rotate. When the Patrone is mounted in a camera, a pressing member in a camera body, which is not a film rewind axis, actuates the locking chip so that the locking chip will disengage from the locked chip. The spool is then enabled to rotate.

What is claimed is:

1. A patrone that enables film to move only when mounted in the camera, comprising:
   a substantially cylindrical body for storing film and including means enabling the film to move freely in or out of said body;
   a film wind spool arranged to rotate freely in said cylindrical body and having upper and lower ends enclosed in said cylindrical body;
   locking means arranged to freely move along a path parallel to an axis of said spool;
   pressing means in said cylindrical body for causing said locking means to project from upper and lower ends of said cylindrical body when said patrone is not mounted in a camera;
   locked means arranged on said spool for engaging said locking means when said locking means is urged by said pressing means into engagement with said locked means when said patrone is not mounted in a camera, whereby to prevent said spool from rotating when said patrone is not mounted in said camera, said locked means being disengaged from said locking means by virtue of said locking means being urged to a disengaging position by a pressing force from a wall of a spool compartment in a camera when said patrone is mounted in said camera to thereby enable the rotation of said spool when said patrone is mounted in a camera.

2. A patrone that enables film to move only when mounted in a camera, comprising:
   a substantially cylindrical body for storing film;
   a film wind spool arranged to rotate freely in said cylindrical body and having upper and lower ends enclosed in said cylindrical body;
   flanges located at opposite ends of said spool about which film is wound;
   at least one of said flanges having notches formed on an outer surface thereof;
   moving means movable between a projecting position projecting outwardly from said cylindrical body and a storage position at least partially stored in said spool, said moving means being moved in a direction parallel to a spool axis by a pressing force from a wall of a spool compartment where said moving means is loaded when said moving means located in said projecting position;
   locking means arranged in said moving means for preventing said spool from rotating by engaging said notches when said moving means moves to said projecting position, and said locking means permitting said spool to rotate when said moving means moves to said storage position; and
   elastic means urging said locking means toward said notched flanges so that at least one of said notches engages said locking means when said patrone is not mounted in a camera.

3. In combination, a camera and a patrone that enables film to move only when mounted in the camera, said patrone comprising:

a substantially cylindrical body for storing film and including means enabling the film to move freely in or out of said body;

a film wind spool arranged to rotate freely in said cylindrical body and having upper and lower ends enclosed in said cylindrical body;

locking means arranged to freely move along a path parallel to an axis of said spool;

pressing means in said cylindrical body for causing said locking means to project from upper and lower ends of said cylindrical body when said patrone is not mounted in the camera;

locked means arranged on said spool for engaging said locking means when said locking means is urged by said pressing means into engagement with said locked means when said patrone is not mounted in the camera, whereby to prevent said spool from rotating when said patrone is not mounted in said camera, said locked means being disengaged from said locking means by virtue of said locking means being urged to a disengaging position by a pressing force from a wall of a patrone receiving chamber the camera when said patrone is mounted in said camera to thereby enable the rotation of said spool when said patrone is mounted in the camera; and said wall of said patrone receiving chamber includes a member for disengaging said locking means from said locked means by applying said pressing force when the patrone is placed in said patrone receiving chamber.

* * * * *